(No Model.)
M. SWENSON.
ICE VELOCIPEDE.
No. 529,088. Patented Nov. 13, 1894.
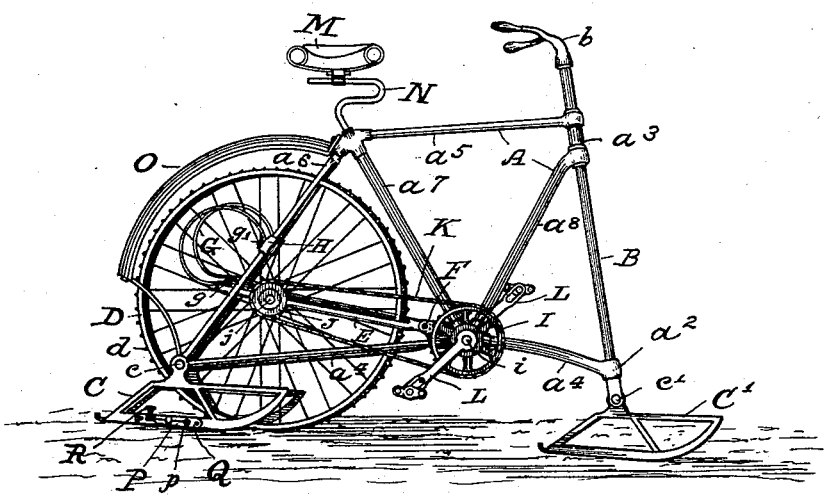
Fig. 1.
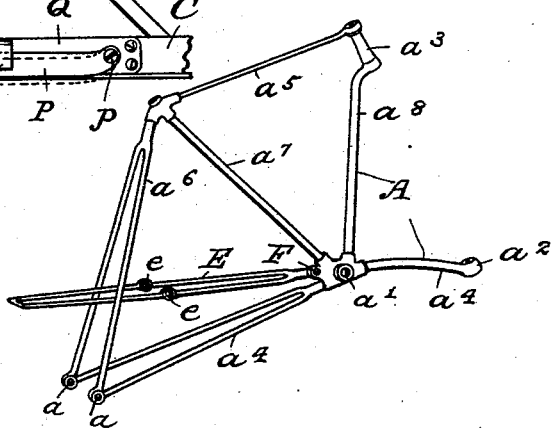
Fig. 3.   Fig. 2.
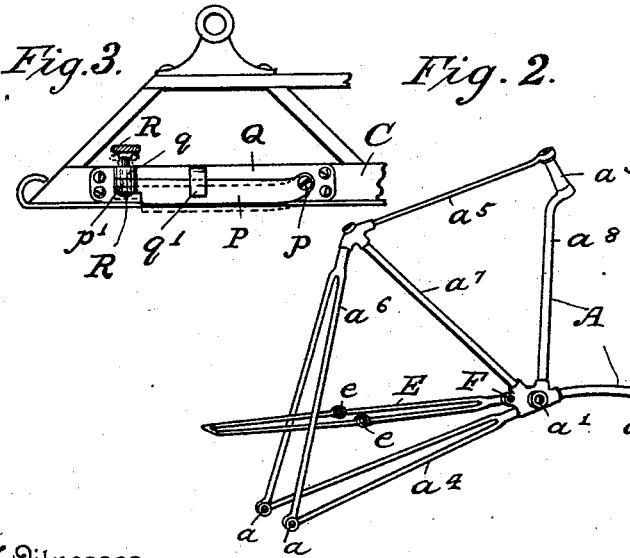
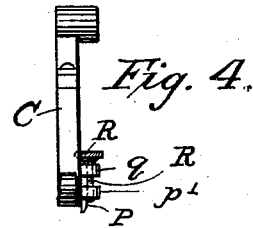
Fig. 4.
Witnesses
John W. Storrs
H. H. Johnson
Inventor
Malcom Swenson
By his Attorney
J. B. Thurston
THE NORRIS PETERS CO., PHOTO-LITHO., WASHINGTON, D. C.

UNITED STATES PATENT OFFICE.

MALCOM SWENSON, OF CONCORD, NEW HAMPSHIRE.

ICE-VELOCIPEDE.

SPECIFICATION forming part of Letters Patent No. 529,088, dated November 13, 1894.

Application filed March 6, 1894. Serial No. 502,519. (No model.)

*To all whom it may concern:*

Be it known that I, MALCOM SWENSON, a citizen of the United States, residing at Concord, in the county of Merrimac and State of New Hampshire, have invented certain new and useful Improvements in Bicycles; and I do hereby declare the following to be a full, clear, and exact description of the invention, such as will enable others skilled in the art to make and use the same.

This invention relates to the construction of vehicles designed for propulsion upon snow or ice, and the invention will be fully set forth in the following specification and claims, and clearly illustrated in the accompanying drawings forming a part thereof, of which—

Figure 1. is an elevation showing one of my improved machines complete. Fig. 2. is a detached perspective view of the frame of one of my improved machines. Fig. 3. is a broken elevation of one of the runners of my machine, and Fig. 4. is an end elevation of one of said runners.

Similar letters denote like parts.

The frame A is preferably made in substantially the form and of the parts shown, having perforations $a\ a$, for the rear runner, a perforation $a'$, for the crank shaft and bearings $a^2\ a^3$, for mounting the steering rod B.

The runners C, are mounted by suitable studs $c$ and the runner C', is secured to the lower end of the steering rod B, by a stud $c'$, and upon the top of said rod is placed a steering bar $b$.

A propelling wheel D, provided on its periphery with prongs $d$, is mounted in a movable frame E, pivoted at F, to the machine frame A. This movable frame E, is shown in Fig. 1. in the form of a fork, but in Fig. 2. the frame is made so that it will surround the wheel D, and this last named construction is the one I prefer as it is much more firm.

Suitable springs G, connect the frames A—E, at $g$—$g'$, exerting a slight pressure in the direction of gravity and thereby assist the wheel D in following the moderate deviations from the horizontal when passing over uneven ice or snow.

In order that the frame may not be weakened by attaching the springs G, collars H may be rigidly secured thereon, and one end of the springs attached thereto by screws $g'$.

The sprocket wheel I, is mounted upon the crank shaft $i$, and is connected with the sprocket wheel J, mounted upon the shaft $j$, of the propelling wheel D, by the chain belt K, and power imparted by the cranks L in the usual manner.

A suitable saddle M, is mounted upon a bar N upon which it may be adjusted if desired.

A fender O, is secured over the rear portion of the propelling wheel D, to prevent contact with the clothing of the rider.

In order to prevent the bicycle from sluing and turning over when a rider attempts a short curve on smooth ice, sharp blades P, may be adjustably attached to the runners, and be raised or lowered for service when occasion requires. These blades may be attached in any convenient manner, that construction shown in the drawings comprising a plate Q, provided with an ear $q$, having a threaded perforation and a tongue $q'$, and a blade P, pivoted at $p$ to said plate Q, resting under the tongue $q'$, and provided at its opposite end with an enlarged portion $p'$ perforated to receive the pivotal end of the thumb screw R, which is threaded to the ear $q$, of the plate Q.

The particular form of frame comprising the horizontal portions $a^4\ a^5$, and the inclined uprights $a^6,\ a^7\ a^8$, I consider of some importance, as a strong and firm construction.

Having described my invention, what I claim is—

1. In an ice velocipede comprising a drive-wheel and runners, suitable means for preventing the machine from slipping side-ways, the same consisting of a metal plate attached to a runner, said plate provided with an ear having a threaded perforation, and a stop tongue, an adjustable blade pivoted to said plate and resting under the tongue thereof, and provided at its opposite end with a perforation threaded to receive the pivotal end of a thumb screw which is threaded to the ear of said plate.

2. In an ice bicycle having forward and rear runners, driving wheel and propelling mechanism, a main frame comprising two substantially horizontal bars one above the other, their forward end forming bearing supports for a steering rod which carries the forward runner, and a forked portion made in the form of two sides of a triangle, the angles of which are adapted for pivotal connection with the rear runners and the diverging ends being connected one to the upper and one to the lower horizontal bar, oppositely inclined bars arranged in the form of a V, their converging ends being connected with the lower horizontal bar at the point of union of said bar and the lower portion of the forked frame and their upper ends being connected one to the union of the upper horizontal bar and the upper portion of said forked frame, and the other to the upper bearing of the steering bar, and a pivoted frame arranged within said fork and mounting the drive-wheel, its forward end being connected with the main frame at the point of union of the lower horizontal bar, the oppositely inclined bars, and the fork, and suitable springs made in form of a segment of a circle and connecting opposite sides of said pivoted frame with opposite sides of said fork, substantially for the purpose set forth.

In testimony whereof I affix my signature in presence of two witnesses.

MALCOM SWENSON.

Witnesses:
J. B. THURSTON,
CARRIE E. EVANS.